United States Patent
Hu et al.

(10) Patent No.: US 8,325,650 B2
(45) Date of Patent: Dec. 4, 2012

(54) METHOD FOR REDUCING DELAY IN A COMMUNICATION SYSTEM EMPLOYING HARQ

(75) Inventors: Rong Hu, Beijing (CN); Hai Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 549 days.

(21) Appl. No.: 12/447,844

(22) PCT Filed: Nov. 1, 2006

(86) PCT No.: PCT/SE2006/050445
§ 371 (c)(1), (2), (4) Date: Apr. 29, 2009

(87) PCT Pub. No.: WO2008/054274
PCT Pub. Date: May 8, 2008

(65) Prior Publication Data
US 2010/0067460 A1    Mar. 18, 2010

(51) Int. Cl.
*H04W 4/00*  (2009.01)
*H04L 1/18*  (2006.01)
(52) U.S. Cl. ........................... 370/328; 714/748
(58) Field of Classification Search ............. None
See application file for complete search history.

(56) References Cited

U.S. PATENT DOCUMENTS

| | | | | |
|---|---|---|---|---|
| 6,246,693 | B1 * | 6/2001 | Davidson et al. | 370/445 |
| 7,032,153 | B1 * | 4/2006 | Zhang et al. | 714/749 |
| 2003/0174662 | A1 | 9/2003 | Malkamaki | |
| 2007/0274264 | A1 * | 11/2007 | Jiang | 370/333 |
| 2008/0285491 | A1 * | 11/2008 | Parkvall et al. | 370/310 |

FOREIGN PATENT DOCUMENTS

| WO | WO 2005/109729 A1 | 11/2005 |
|---|---|---|
| WO | WO 2006/002658 * | 1/2006 |
| WO | WO 2006/048742 A1 | 5/2006 |

OTHER PUBLICATIONS

International Search Report dated Aug. 18, 2007 (4 pages).
International Preliminary Report on Patentability dated Feb. 25, 2009 (7 pages).

* cited by examiner

*Primary Examiner* — Robert Scheibel
(74) *Attorney, Agent, or Firm* — Myers Bigel Sibley & Sajovec, P.A.

(57) ABSTRACT

The invention relates to a method and an arrangement for reducing transmission delay on a radio interface in a communication network, comprising a communication network node (15) transmitting packet data to one or more user equipments (18) over said radio interface. A number of transmission attempts needed for transmitting said packet data estimating, based on which a number of re-transmissions of said first packet data to perform is determined. The determined number of re-transmission is proactively transmitted before an ACK or NACK message is received from the user equipments.

8 Claims, 4 Drawing Sheets

METHOD FOR REDUCING DELAY IN A COMMUNICATION SYSTEM EMPLOYING HARQ

TECHNICAL FIELD

The present invention relates to a method and an arrangement in a communication system, and in particular to an arrangement allowing for reducing transmission delay on a radio interface as well as a method for such reduction. The invention further relates to a computer-readable medium containing computer program for reducing transmission delay on a radio interface.

BACKGROUND OF THE INVENTION

In a system using hybrid ARQ (Automatic Repeat Request), data are coded and transmitted to the receiver. The receiver tries to decode the data and, if errors are found in the received data, the receiver requests a retransmission of the data unit by transmitting a negative acknowledgement (NACK) signal to the transmitter. If no errors are found in the decoding process, the received data unit is considered to be correctly received and the receiver transmits an acknowledgement (ACK) signal to the transmitter. The performance of the hybrid ARQ (HARQ) mechanism can be further enhanced by performing soft combining, i.e., the receiver buffers the erroneously received data unit and combines the buffered soft information with the soft information received due to the retransmission(s). By using several HARQ retransmissions the effective data rate is reduced and the data can be transmitted at the cell border but with an increased delay.

In HSDPA systems, the user data is carried over HS-DSCH (High Speed-Downlink Shared Channel) while the control information including the transport format and also the HARQ information, e.g. HARQ process number and a new data indicator, is carried over HS-SCCH (High Speed-Shared Control Channel). Each HARQ entity is capable of supporting multiple (up to 8) stop-and-wait HARQ processes. The motivation behind this is to allow for continuous transmission to a single UE, which cannot be achieved by a single stop-and-wait scheme. Configuring the number of HARQ processes is done by the network through higher-layer signaling. The transport format selection for user data transmission is usually based on the received CQI (Channel Quality Indicator) and available HS power, to meet a certain received quality requirement (e.g. 10% BLER). However, in some cases, due to a bad radio condition (e.g., in deep fading or at the cell border), or due to not enough resources available (e.g., channelization codes or HS power), any transport format even the smallest transport block size (e.g. 365 bits), can not be selected. In a multi-user scheduling environment, this results in that some users at the cell border maybe have no chances to be scheduled due to a very low achievable received quality, even using a round-robin scheduler, which is a relatively fair scheduler in the resource sharing sense. Not selecting any transport block becomes an issue in such cases, in particular for some delay sensitive services that normally have tight delay requirements.

One solution can be to loose the received quality requirement in the Node B for the smallest transport format (e.g. 365 bits). For instance, changing the minimum received quality requirement in terms of HS-DSCH Signal-to-Noise Ratio (SNR) to a relatively low value might result in data transmission anyway, although the consequence could be to have some retransmissions because relatively low received quality will have a higher block error probability than the desired 10% level. Of course, this solution could be better than transmitting nothing from the delay perspective.

One problem in the above solution of loosing the received quality requirement is that the delay for the selected smallest transport format could be still relatively long, compared to the required delay for those delay sensitive services. The reason is that Node B has to wait for the feedback reported from the UE after the first transmission. However, the feedback could be most likely a NACK as the received quality doesn't meet the desired requirement (10% BLER).

SUMMARY OF THE INVENTION

Accordingly, it is an objective with the present invention to provide an improved method of reducing transmission delay on a radio interface in a communication network, comprising a communication network node transmitting data to one or more user equipments over said radio interface.

Another objective with the present invention is to provide an improved communication network node arranged to transmit to one or more user equipments over a radio interface in a communication network and to reduce transmission delay on the radio interface.

A further objective with the present invention is to provide an improved user equipment arranged to receive packet data from a transmitter in order to reduce transmission delay over a radio interface in a communication network, A still further objective with the present invention is to provide an improved computer-readable medium of reducing transmission delay on a radio interface in a communication network, comprising a communication network node transmitting data to one or more user equipments over said radio interface.

Further embodiments are listed in the dependent claims.

Thanks to the provision of a method and an arrangement which pro-actively transmits packet data over a radio interface before a feedback message has been received, the delay for transport blocks over the radio interface is reduced.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF PREFERRED EMBODIMENTS

Figure 1:
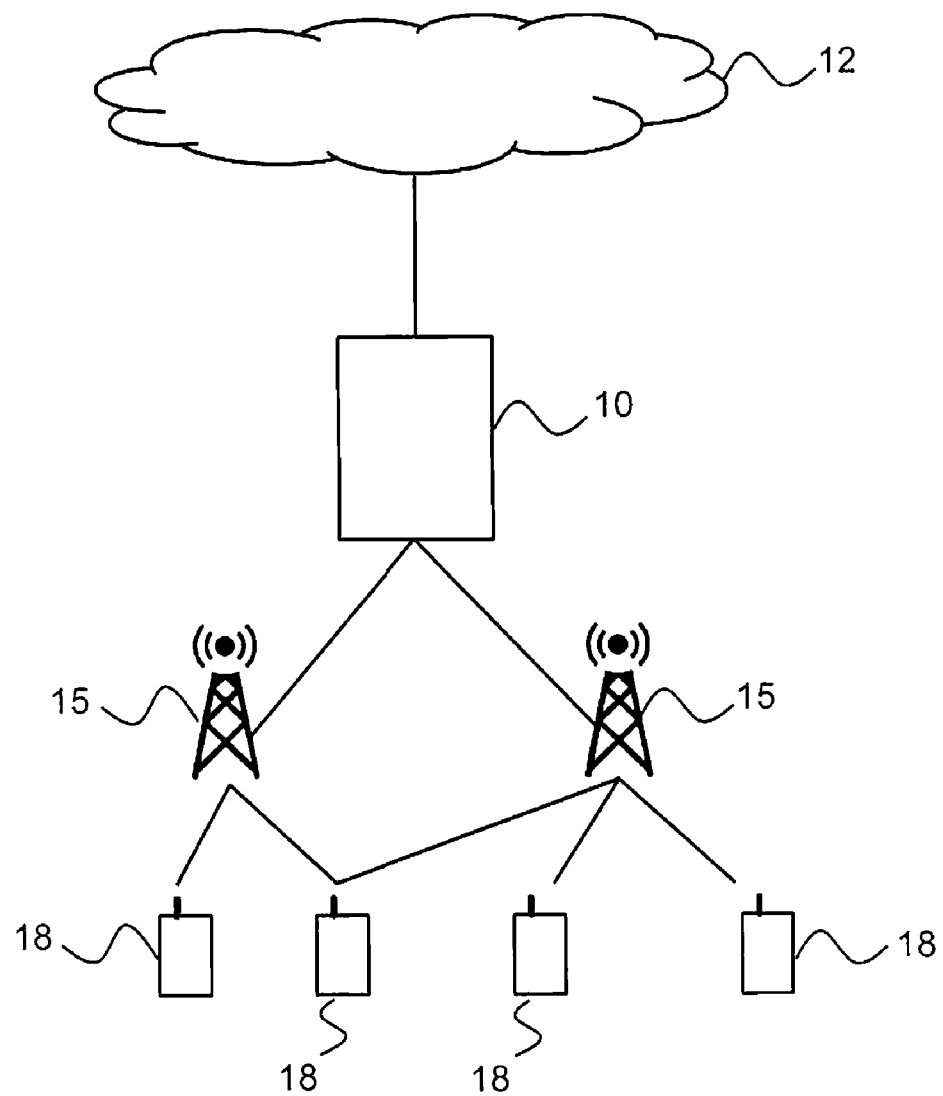
FIG. 1 shows the communication network architecture according to the present invention.

FIG. 1 depicts a communication system such as a WCDMA communication system including a Radio Access Network (RAN), such as the UMTS Terrestrial Radio Access Network (UTRAN) architecture, comprising at least one Radio Base Station (RBS) (or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels and uplink (UL) channels. On the downlink channel, the RBS 15 transmits to each user equipment 18 at respective power level. On the uplink channel, the user equipments 18 transmit data to the RBS 15 at respective power level. According to a preferred embodiment of the present invention, the communication system is herein described as a WCDMA communication system. The skilled person, however, realizes that the inventive method and arrangement works very well on other communications systems as well.

The total transmission times, $N_{total}$, can be estimated as follows, but not limited to:

$$N_{total} = \left\lceil \frac{\gamma_{required}}{\gamma_{achievable}} \right\rceil,$$

where $\gamma$ is the Signal-to-Interference Ratio (SIR) in the linear scale. $\gamma_{required}$ is the required SIR to meet a certain QoS requirement, e.g. 10% BLEB while $\gamma_{achievable}$ is the achievable SIR, given the available HS power and HS codes. Here the assumption is that the chase combining is used in HARQ process. The other algorithms of estimating the transmission times can be used in the proposed proactive retransmission.

Regarding the feasibility of this idea, it is known that DL asynchronous HARQ is different from EUL synchronous HARQ, which means that the same HARQ process in consecutive transmission time intervals (TTI:s) to the UE on the DL is possible. So, given the number of retransmissions, it is easy to implement the proactive retransmissions.

Figure 2:
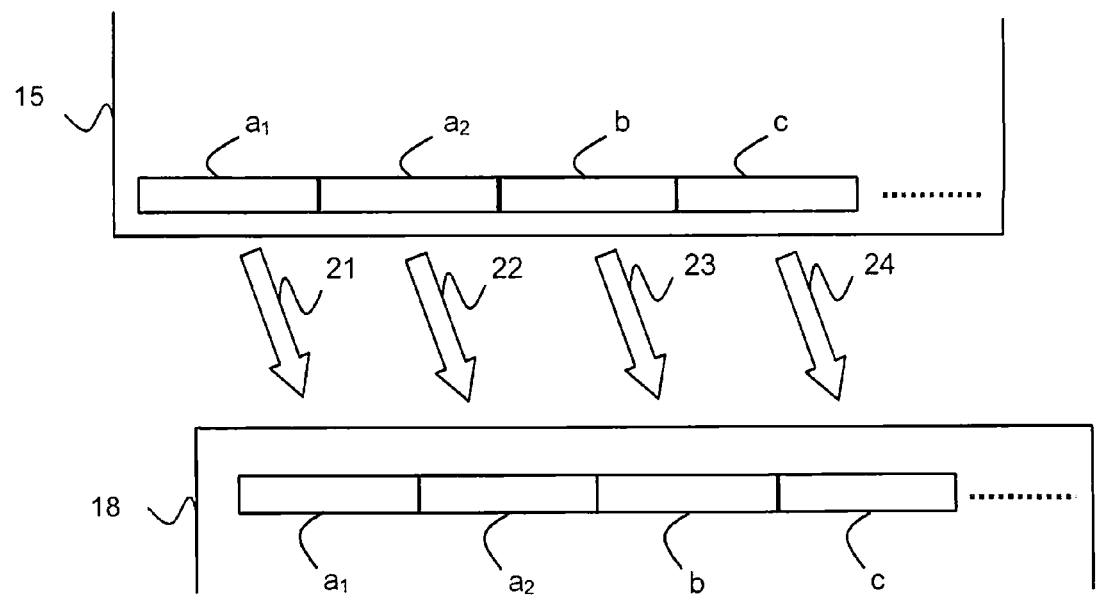
FIG. 2 illustrates a hybrid ARQ scheme with proactive retransmissions according to the present invention.

FIG. 2 shows a HARQ scheme with proactive retransmissions according to a preferred embodiment of the present invention. The RBS 15 transmits packet data in the form of data blocks, a, b and c and so on, to the UE 18 over the radio interface. In FIG. 2, one proactive retransmission is shown as $a_2$. The transmissions, here shown with arrows 21-24, comprises the HARQ process number (herein a-c) a new-data indicator which may be set to 1 if it is a new transmission and set to 0 if it is a re-transmission. Thus, $a_1$ is a first transmission and the transmission 21 has the new-data indicator set to 1, while $a_2$ is a re-transmission and the transmission 22 has the new-data indicator set to 0. Likewise, b and c are first transmissions meaning that the transmissions 23 and 24 respectively have the new-data indicator set to 1.

Node B Side

Given the transmission times, Node B can schedule consecutive TTI:s to the UE. Meanwhile, since there is a new data indicator indicating that the data is a first transmission or a retransmission, Node B can set this indicator to be a retransmission for the proactive retransmission after the first transmission.

If the first transmission is successful anyway and the Node B doesn't know this information before it receives the ACK, in such case, Node B doesn't need to wait this ACK feedback although the proactive retransmission makes no sense. After receiving an ACK from the UE, Node B immediately stops the proactive retransmission for that data block no matter how many transmissions are estimated in advance.

Figure 4:
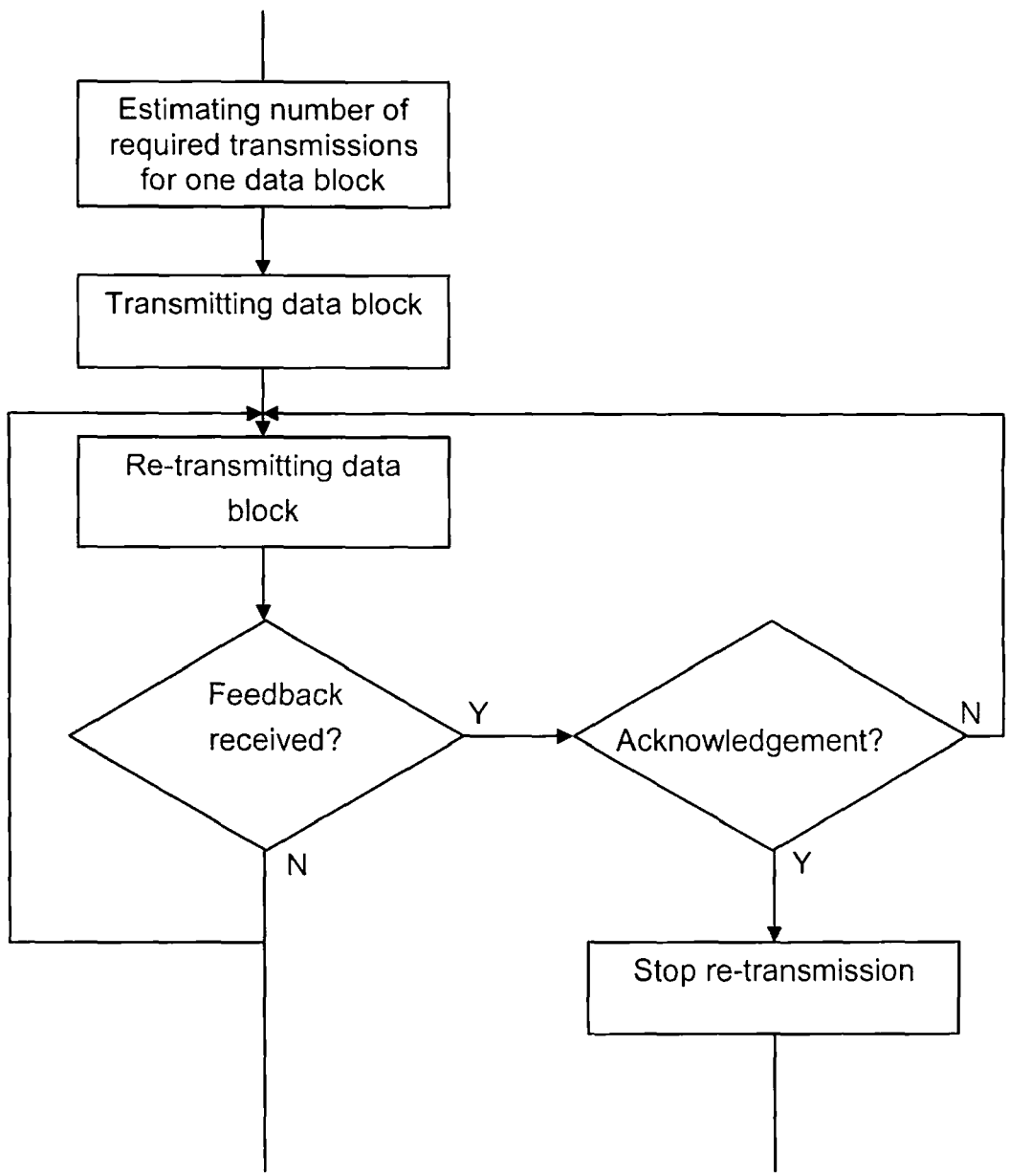
FIG. 4 is a flowchart showing the inventive method implemented in a radio base station.

The procedure in a communication network node, such as the radio base station (or Node B), of reducing transmission delay on a radio interface in a communication network, comprising the communication network node transmitting packet data (or data blocks) to one or more user equipments over said radio interface, shown in FIG. 4, is as follows:

estimating a number of required transmission attempts needed for transmitting one data block;

transmitting the data block to the user equipment;

based on the estimated number of transmission attempts, determining a number of proactive re-transmissions of said first packet data to perform;

re-transmitting said first packet data said determined number of times;

waiting for a feedback message on said first transmitted packet data from the receiving entity, i.e. the user equipment;

if a feedback message is received and if it is an acknowledgement, interrupting said re-transmissions of the packet data;

otherwise, keep on sending the re-transmissions until the determined number of re-transmissions have been reached.

UE Side

It is realistic to assume that UE:s are able to process data from the same HARQ process in consecutive TTI:s. As usual, the UE needs to detect the HS-SCCH carrying HARQ process number and New-data indicator. If it is a retransmission, the received data should be combined with previously received data in some way. If the data is already correctly decoded from the first transmission or before the proactive retransmission completely finishes, the UE will discard the received data from the following possible proactive retransmission.

Figure 5:
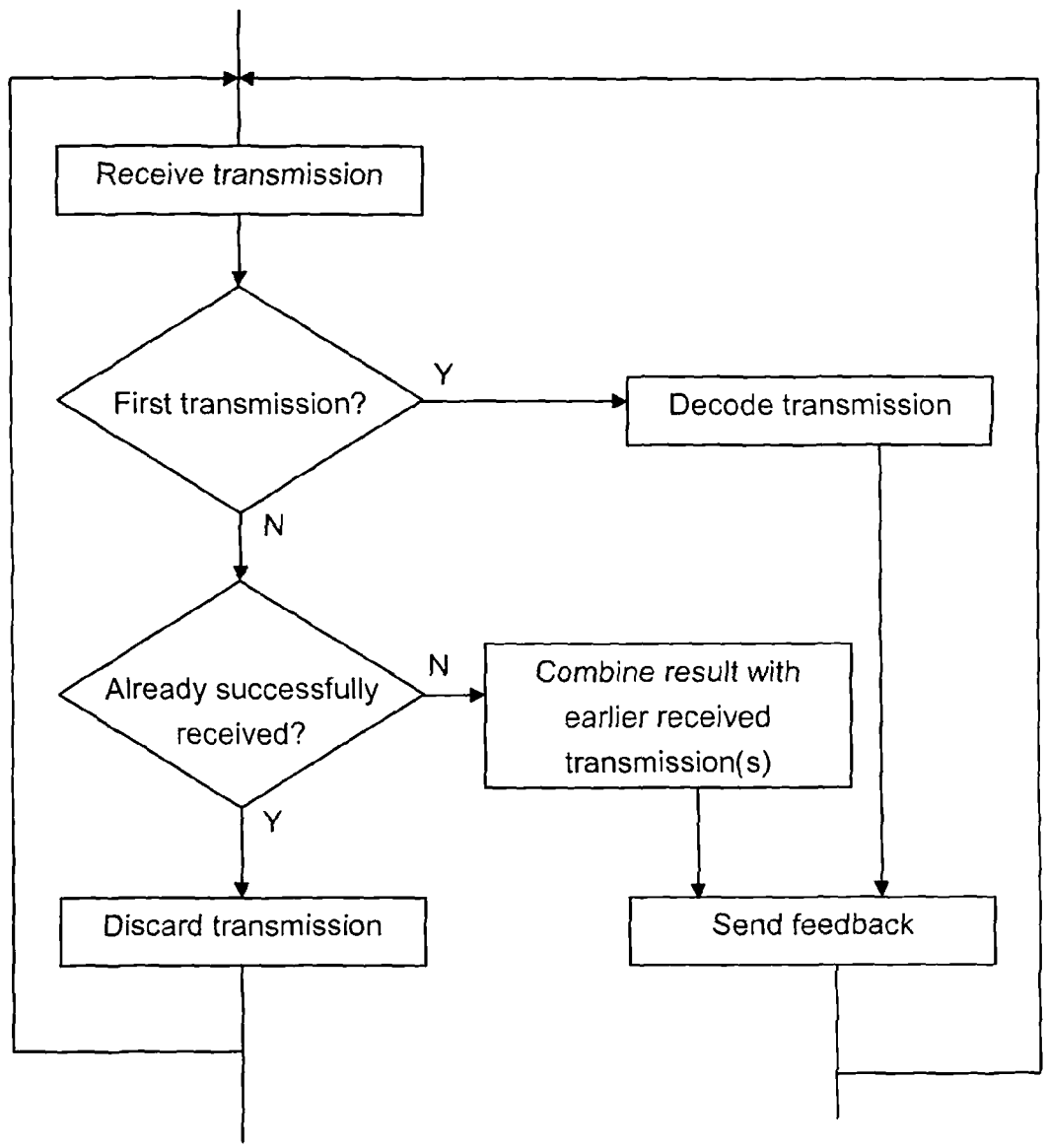
FIG. 5 is a flowchart showing the inventive method implemented in a user equipment.

The procedure in a user equipment of reducing transmission delay on a radio interface in a communication network, comprising a communication network node, such as a radio base station (or Node B), transmitting packet data (or data blocks) to one or more user equipments over said radio interface, shown in FIG. 5, is as follows:

receiving a packet data transmission from the communication network node;

if the received transmission is a first transmission, decoding the packet data and sending feedback to the communication network node, either an ACK or a NACK;

otherwise, checking if the transmission already has been successfully received;

if the transmission already has been successfully received, discarding the transmission;

otherwise, combining the result with earlier received transmission(s) and sending feedback to the communication network node, either an ACK or a NACK.

This idea can be extended to be applicable for not only the smallest transport block, but also larger transport block. For the latter case, there could be a UE capability issue since the Turbo decoding in UE:s could take longer than 2 ms (one HS TTI) for decoding large transport block. If the same block is received in many consecutive TTI:s but the UE is not capable of decoding it in each TTI, this will result in that a data block is thrown away before UE decodes it to "catch up". If the large transport block is really a problem, it can also be specified in the standard that the UE shall support the proactive retransmissions if the transport block size is smaller than some value (that could be quite small) e.g. around 1000 bits.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Figure 3:
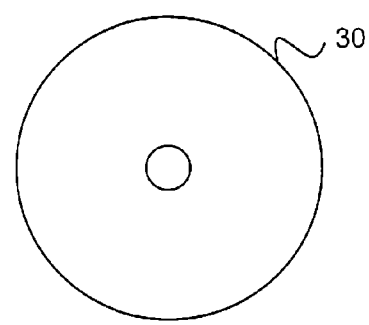
FIG. 3 shows an example of a computer readable medium.

Moreover, the invention can additionally be considered to be embodied entirely within any form of computer-readable storage medium, an example of which is shown in FIG. 3 and denoted 30, having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" 30 can be any means that can contain, store, communicate, propagate, or transport the program for use by or in connection with the instruction-execution system, apparatus or device. The computer-readable medium 30 can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for is provided wherein the computer program performs the steps of:

estimating a number of transmission attempts needed for transmitting said packet data;
transmitting a first packet data;
based on said estimated number of transmission attempts, determining a number of re-transmissions of said first packet data to perform;
re-transmitting said first packet data said determined number of times.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of reducing transmission delay on downlink channels over a radio interface in a communication network, comprising a communication network node transmitting packet data to one or more user equipments over said radio interface, the method comprising:
   estimating a number of transmission attempts needed for transmitting said packet data based on a ratio of the signal-to-interference ratio that is required to meet the certain quality-of-service requirement and a signal-to-interference ratio that is achievable;
   transmitting a first packet data; and
   re-transmitting said first packet data said estimated number of transmission attempts without waiting for a feedback message from a user equipment between each re-transmission of said first packet data.

2. A method according to claim 1, where the method further comprises:
   continuing retransmission of said first packet data until the earlier of reaching said estimated number of transmission attempts or receiving a feedback message containing an acknowledgement from the user equipment for said first transmitted packet data.

3. A method according to claim 2, where the method further comprises:
   continuing retransmission of said first packet data in response to receiving a feedback message containing a negative acknowledgement from the user equipment for said first transmitted packet data.

4. A communication network node arranged to transmit packet data to one or more receivers on downlink channels over a radio interface in a communication network and to reduce transmission delay on said radio interface, where said communication network node comprising:
   circuitry that is configured to:
      estimate a number of transmission attempts needed for transmitting said packet data based on a ratio of the signal-to-interference ratio that is required to meet the certain quality-of-service requirement and a signal-to-interference ratio that is achievable;
   transmit a first packet data; and
   re-transmit said first packet data said estimated number of transmission attempts without waiting for a feedback message from a user equipment between each re-transmission of said first packet data.

5. A communication network node according to claim 4, where the communication network node further comprising:
   circuitry that is configured to:
      interrupt said re-transmissions in response to receiving a feedback message containing an acknowledgement from the user equipment for said first transmitted packet data.

6. A communication network node according to claim 4, where the communication network node further comprising:
   circuitry that is further configured to:
      continue retransmission of said first packet data until said estimated number of transmission attempts is reached, in response to the receiver block receiving the feedback message containing a negative acknowledgement from the user equipment for said first transmitted packet data.

7. A communication network node according to claim 4, where the communication network node is a radio base station.

8. A non-transitory computer-readable medium containing a computer program for reducing transmission delay on downlink channels over a radio interface in a communication network, comprising a communication network node transmitting packet data to one or more user equipments over said radio interface, where the computer program, when executed by a processor, cause the processor to perform a method comprising:
   estimating a number of transmission attempts needed for transmitting said packet data based on a ratio of the signal-to-interference ratio that is required to meet the certain quality-of-service requirement and a signal-to-interference ratio that is achievable;
   transmitting a first packet data;
   re-transmitting said first packet data said estimated number of transmission attempts without waiting for a feedback message from a user equipment between each re-transmission of said first packet data.

* * * * *

UNITED STATES PATENT AND TRADEMARK OFFICE
CERTIFICATE OF CORRECTION

PATENT NO. : 8,325,650 B2  
APPLICATION NO. : 12/447844  
DATED : December 4, 2012  
INVENTOR(S) : Hu et al.

It is certified that error appears in the above-identified patent and that said Letters Patent is hereby corrected as shown below:

In Column 3, Line 27, delete "BLEB" and insert -- BLER --, therefor.

Signed and Sealed this  
Nineteenth Day of March, 2013

Teresa Stanek Rea  
*Acting Director of the United States Patent and Trademark Office*